(12) United States Patent
Chang et al.

(10) Patent No.: US 9,683,313 B2
(45) Date of Patent: Jun. 20, 2017

(54) METHOD OF MAKING CARBON FIBERS FROM LIGNIN

(71) Applicant: GrafTech International Holdings Inc., Parma, OH (US)

(72) Inventors: Ching-Feng Chang, Strongsville, OH (US); Bassam Alnasleh, Parma Heights, OH (US); Omer Gul, Olmsted Falls, OH (US); Robert E Miller, Southhaven, MS (US); Andrew Hausner, Parma Heights, OH (US); Orest L Adrianowycz, Broadview Heights, OH (US); Chong Chen, Broadview Heights, OH (US); Brian Paul Askey, Parma Heights, OH (US)

(73) Assignee: GrafTech International Holdings Inc., Parma, OH (US)

( * ) Notice: Subject to any disclaimer, the term of this patent is extended or adjusted under 35 U.S.C. 154(b) by 101 days.

(21) Appl. No.: 14/429,828

(22) PCT Filed: Aug. 20, 2013

(86) PCT No.: PCT/US2013/055654
§ 371 (c)(1),
(2) Date: Mar. 20, 2015

(87) PCT Pub. No.: WO2014/046826
PCT Pub. Date: Mar. 27, 2014

(65) Prior Publication Data
US 2015/0233023 A1    Aug. 20, 2015

Related U.S. Application Data

(60) Provisional application No. 61/703,348, filed on Sep. 20, 2012.

(51) Int. Cl.
| | |
|---|---|
| *C01B 31/02* | (2006.01) |
| *C08H 6/00* | (2010.01) |
| *D01D 5/04* | (2006.01) |
| *D01D 5/08* | (2006.01) |
| *D01D 10/02* | (2006.01) |
| *D02J 13/00* | (2006.01) |
| *D01F 9/17* | (2006.01) |
| *C07G 1/00* | (2011.01) |
| *D01D 5/06* | (2006.01) |

(52) U.S. Cl.
CPC ............... *D01F 9/17* (2013.01); *C07G 1/00* (2013.01); *D01D 5/06* (2013.01)

(58) Field of Classification Search
CPC . C01B 31/02; C08H 6/00; D01D 5/04; D01D 5/06; D01D 5/08; D01D 10/02; D01F 9/17; D02J 13/00
USPC ...... 264/29.2, 29.6, 29.7, 211.17; 423/447.4, 423/447.7, 447.8
See application file for complete search history.

(56) References Cited

U.S. PATENT DOCUMENTS

| | | |
|---|---|---|
| 5,344,921 A | 9/1994 | Sudo |
| 5,709,774 A | 1/1998 | Naieni |
| 6,855,180 B1 | 2/2005 | Pinatti |
| 2008/0185112 A1 | 8/2008 | Argyropoulos |
| 2013/0183227 A1* | 7/2013 | Wohlmann ............... D01F 9/17 423/447.4 |

FOREIGN PATENT DOCUMENTS

| | | |
|---|---|---|
| WO | 81/03332 | 11/1981 |
| WO | 2012/038259 | 3/2012 |
| WO | 2012/112108 | 8/2012 |

OTHER PUBLICATIONS

Horst Nimz, "Beech Lignin—Proposal of a Constitutional Scheme", Angew. Chem. internat. Edit., vol. 13, 1974, No. 5, pp. 313-321.
Nunn et al., "Product Compositions and Kinetics in the Rapid Pyrolysis of Milled Wood Lignin", American Chemical Society, Ind. Eng. Chem. Process Des. Dev., vol. 24, 1985, pp. 844-852.
Cliff Eberle, "Commercialization of New Carbon Fiber Materials Based on Sustainable Resources for Energy Applications", Oak Ridge National Laboratory, Mar. 2013.
International Search Report with Written Opinion from corresponding International Application No. PCT/US2013/055654, Dated Jan. 30, 2014.
International Search Report from corresponding International Application No. PCT/US2013/055654, Dated Jan. 30, 2014.
Luo, J. "Lignin-Based Carbon Fiber" (Thesis). The University of Maine, May 2010.
Manufacturing: Synthetic and Cellulosic Fiber Formation Technology, downloaded from the Internet at <<http://www.fibersource.com/f-tutor/techpag.htm>> on Mar. 19, 2015.

* cited by examiner

Primary Examiner — Leo B Tentoni
(74) Attorney, Agent, or Firm — Tucker Ellis, LLP

(57) ABSTRACT

A method of making a carbon fiber includes heat treating a lignin precursor absent an active ingredient in an inert atmosphere to raise the glass transition temperature (Tg) of the precursor by at least five (5%) percent, forming a lignin precursor having an increased Tg (High Tg Lignin). The High Tg Lignin can be spun into a fiber. The fiber may then be stabilized to form a thermoset fiber. The time period for stabilizing the fiber is less than one hundred (100) hours.

19 Claims, 3 Drawing Sheets

METHOD OF MAKING CARBON FIBERS FROM LIGNIN

BACKGROUND

Technical Field

The disclosure relates to the field of carbon fibers and precursors for the making of carbon fibers as well as preparing lignin for use as a precursor for the making of the carbon fibers.

Carbon fibers were first developed in 1958. Since that time, carbon fibers have found use in a wide variety of applications, including, for example, insulation, reinforced composite materials, filtration of high-temperature gasses, and additives in graphite electrodes.

BRIEF DESCRIPTION

Included herein is a method of making a carbon fiber. The method may include heat treating a lignin precursor in an inert atmosphere at a sufficient temperature for a sufficient period of time to raise the glass transition temperature (Tg) of the precursor by at least five (5%) percent, thereby forming a lignin precursor having an increased Tg (High Tg Lignin). The method may optionally include spinning the High Tg Lignin into a fiber as well as stabilizing the fiber for a period of time of less than one hundred (100) hours under sufficient conditions to thereby form a thermoset fiber.

Further included is a method of making a carbon fiber precursor. The method includes heat treating a lignin precursor absent an active ingredient at a sufficient temperature for a sufficient period of time to raise the glass transition temperature (Tg) of the precursor to more than 100° C., thereby forming a lignin precursor having an increased Tg (High Tg Lignin).

A method of making a lignin carbon fiber precursor in an oxidizing atmosphere is also included. Such a method includes heat treating a lignin precursor in an oxidizing atmosphere at a sufficient temperature for a sufficient period of time to raise the glass transition temperature (Tg) of the precursor by at least five (5%) percent but not above the combustion temperature of the precursor, thereby forming a lignin precursor having an increased Tg (High Tg Lignin).

This disclosure further includes another method of making a carbon fiber precursor. This method includes heat treating a lignin precursor in an inert atmosphere at a sufficient temperature for a sufficient period of time to raise the glass transition temperature (Tg) of the precursor by at least five (5%) percent, thereby forming a lignin precursor having an increased Tg (High Tg Lignin).

It is to be understood that both the foregoing general description and the following detailed description provide embodiments of the disclosure and are intended to provide an overview or framework of understanding to nature and character of the invention as it is claimed.

DETAILED DESCRIPTION

Figure 1:
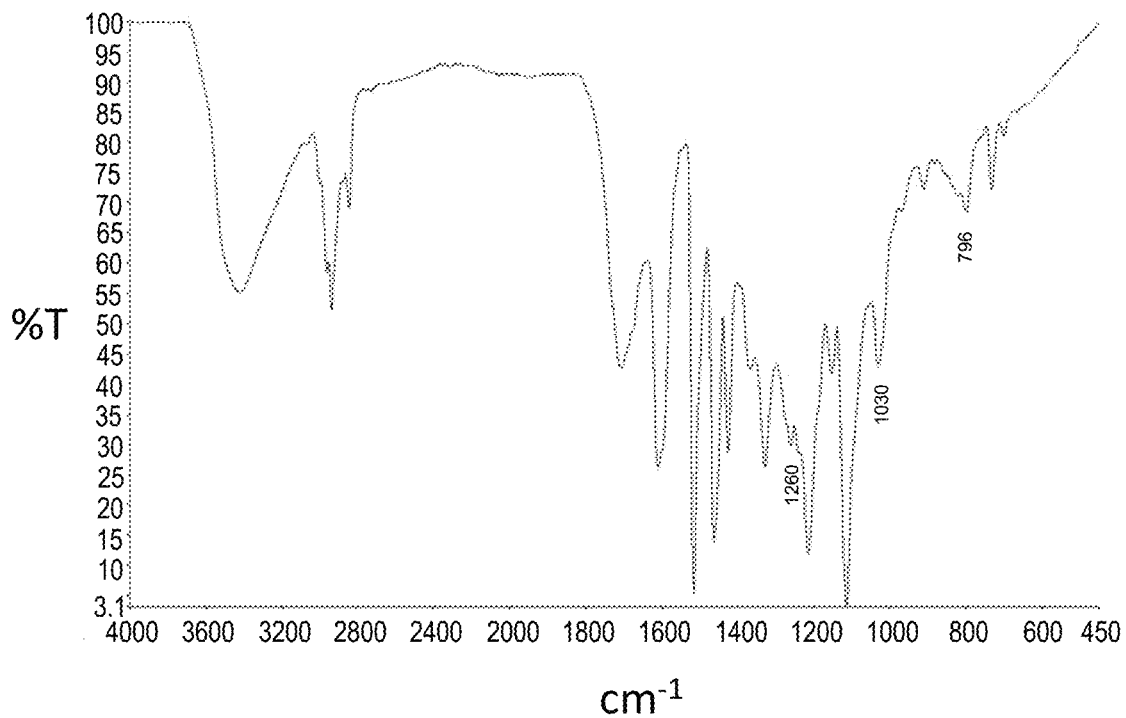
FIG. 1: FTIR spectra of an "as-received" lignin.

An advantage of practicing the method(s) of heat treating of the lignin as described below is that the time for stabilization of the resulting fiber will be reduced. In one particular embodiment disclosed below, the lignin is heat treated sufficiently to raise the glass transition temperature of the lignin.

One method of making carbon fiber disclosed herein includes heat treating a lignin precursor either absent in an active ingredient or in an inert atmosphere at a sufficient temperature for a sufficient period of time to raise the glass transition temperature (Tg) of the precursor by at least five percent, thereby forming a lignin precursor having an increased Tg (High Tg Lignin).

Typical sources of lignin include Weyerhaeuser Co. of Washington State, Lignol Innovations of British Columbia, Canada, Mascoma of Lebanon, N.H., Virdia of Redwood City, Calif., and Fibria Cellulose of Sao Paulo, Brazil.

Lignins can be grouped into three broad classes: softwood or coniferous (gymnosperm), hardwood (dicotyledonous angiosperm), and grass or annual plant (monocotyledonous angiosperm) lignins and combinations thereof. Lignin can also be prepared from other types of biomass, including grasses, and consistent batches of lignin-rich materials recovered from the waste materials in large-scale brewing or biorefinery processes. An example of the lignin precursor includes softwood alkali lignin which may be obtained from the black liquor from softwood alkali pulping processes. In the manufacture of wood pulp, some of the lignin and hemicelluloses are solubilized and separated from the cellulose. The black liquor from the pulping process is the solubilized lignin and hemicellulose.

Hardwood feedstocks include *Acacia; Afzelia; Synsepalum duloificum; Albizia; Alder* (e.g. *Alnus glutinosa, Alnus rubra*); Applewood; *Arbutus*; Ash (e.g. *F. nigra, F. quadrangulata, F. excelsior, F. pennsylvanica lanceolata, F. Latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunnus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Diospyros kurzii, Diospyros Melanida, Diospyros crassiflora*); Elm (e.g. *Ulmus americana, Ulmus procera, Ulmus thomasii, Ulmus rubra, Ulmus glabra*); *Eucalyptus*; Greenheart; Grenadilla; Gum (e.g. *Nyssa sylvatica, Eucalyptus globulus, Liquidambar styraciflua, Nyssa aquatica*); Hickory (e.g. *Carya alba, Carya glabra, Carya ovata, Carya laciniosa*); Hornbeam; Hophombeam; Ipe; Iroko; Ironwood (e.g. *Bangkirai, Carpinus caroliniana, Casuarina equisetifolia, Choricbangarpia subargentea, Copaifera* spp., *Eusideroxylon zwageri, Guajacum officinale, Guajacum sanctum, Hopea odorata*, Ipe, *Krugiodendron ferreum, Lyonothamnus lyonii* (*L. floribundus*), *Mesua ferrea, Olea* spp., *Olneya tesota, Ostrya virginiania, Parrotia persica, Tabebuia serratifolia*); *Jacaranda; Jotoba*; Lacewood; Laurel; Limba; Lignum vitae;

Locust (e.g. *Robinia pseudacacia, Gleditsia triancanthos*); Mahogany; Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus mublenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoume; Oregon Myrtle; California Bay Laurel; Pear; Poplar (e.g. *P. balsamifera, P. nigra*), Hybrid Poplar (*Populus×Canadensis*); Ramin; Red cedar;

Rosewood; Sal; Sandalwood, Sassafras; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks may be selected from acacia, aspen, beech, eucalyptus, maple, birch, gum, oak, poplar, and combinations/hybrids thereof, preferably from *Populus* spp. (e.g. *Populus tremuloides*), *Eucalyptus* ssp. (e.g. *Eucalyptus globulus*), *Acacia* spp. (e.g. *Acacia dealbata*), and combinations/hybrids thereof.

Softwood feedstocks include Araucaria (e.g. *A. cunninghamii, A. angustifolia, A. araucana*); softwood Cedar (e.g. *Juniperus virginiana, Thuja plicata, Thuja occidentalis, Chamaecyparis thyoides, Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus sempervirens*); Rocky Mountain Douglas fir; European Yew; Fir (e.g. *Abies Balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*) Pine (e.g. *Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations thereof. The softwood feedstocks may be selected from loblolly pine (*Pinus taeda*) radiata pine, jack pine, spruce (e.g. white, interior, black), Douglas fir, *Pinus silvestris, Picea abies*, and combinations/hybrids thereof. Further, the softwood feedstocks may be selected from pine (e.g. *Pinus radiata, Pinus taeda*); spruce; and combinations/hybrids thereof.

Absent an active ingredient is used herein to mean a process step that does not include another molecule that will react with the precursor, A.K.A. a reactant. Another way to consider this is that the precursor is heated in an inert atmosphere.

An inert atmosphere is used herein to describe the processing step takes place in the presence of an inert gas such as nitrogen, argon, helium or other members of group 18 of the periodic system, A.K.A. group VIIIA of the periodic chart, and mixtures thereof.

The heat treating the precursor includes heating the precursor to a temperature of at least 100° C. to no more than 400° C. In one particular embodiment the heat treating temperature comprises at least 200° C. In a further embodiment, the heating treating temperature comprises no more than 350° C.

In a certain embodiment, the High Tg Lignin has a Tg which is at least ten (10%) percent higher than the Tg of the precursor. By way of non-limiting example, if the Tg of the precursor was 90° C., the Tg of the High Tg Lignin would be at least 99° C. In a further embodiment, the Tg of the lignin is increased at least twenty (20%) percent, even further at least twenty-five (25%) percent.

Alternatively, instead of heat treating the lignin in an inert atmosphere, the lignin may be heat treated in an oxidizing atmosphere, e.g., air, oxygen, etc. The temperature of such heat treating preferably is below the combustion temperature of the lignin. The combustion temperature is defined at what temperature the lignin will combust in an oxidizing environment.

The method may also include spinning the High Tg Lignin into a fiber. This method is not limited to any particular type of spinning. Suitable examples of how a material may be spun into a fiber include melt spinning, wet spinning (A.K.A. solution spinning), dry jet wet spinning, or centrifugal spinning. The material spun into a fiber may be referred to as a "green fiber", prior to the fiber being stabilized.

Wet spinning is the oldest process. It is used for fiber-forming substances that have been dissolved in a solvent. The spinnerets are submerged in a chemical bath and as the filaments emerge they precipitate from solution and solidify.

In dry-jet wet spinning, the precursor is extruded in fiber form from a spinneret into and through an air gap and then into a coagulation bath in which the precursor is coagulated into a fiber. The passage through the air gap is under some tension and gravity pull which creates some orientation of the precursor molecules in the lengthwise direction of the fiber. Tension is applied to the fiber as it leaves the coagulating bath. This stretches the fiber, which improves the degree of orientation of precursor molecules in the lengthwise direction of the fiber. The fiber may pass through washing steps to remove residual solvent and is dried.

In the melt spinning, the material is heated to above its melting temperature and extruded from the spinneret by mechanical force. The spun fibers are collected by spooling or by other methods.

Centrifugal spinning of carbon fibers includes the use of a head having an exterior shell with a plurality of apertures. A precursor material is supplied to the head in either batch or continuous manner. The precursor may be preheated, heated inside the head or a combination thereof to increase the temperature beyond the respective softening point. When the head is rotated the centrifugal force directs the material radially out the apertures of the exterior shell.

After spinning, the resulting fiber material may be stabilized and carbonized to form a carbon fiber.

For additional description regarding techniques for forming a fiber, the contents of the website http://www.fibersource.com/f-tutor/techpag.htm is incorporated herein in its entirety as if fully rewritten.

In the case of spinning the High Tg Lignin into a fiber, if so desired the viscosity of the High Tg Lignin may be modified to improve the ability to spin the precursor. For example, to reduce the viscosity of the High Tg Lignin, a solvent may be added to the High Tg Lignin. Another technique may be to add a plasticizer to the High Tg Lignin.

The fiber may be stabilized to form a thermoset fiber. One way the fiber can be stabilized is by subjecting the fiber to an oxidizing environment for a sufficient period of time to thermoset the fiber. An example of a sufficient period of time includes less than one hundred (100) hours under. Furthermore the time period can be less than fifty (50) hours, preferably less than fifteen (15) hours, more preferably less than ten (10) hours, even more preferably less than eight (8) hours, most preferably less than three (3) hours. Other examples of suitable time periods include less than twenty (20) hours, less than thirteen (13) hours, and less than seven (7) hours.

In alternative terms, the fibers may be stabilized by an oxidation step, such as by heating the fibers to 200-300° C. in the presence of air or oxygen, to facilitate intra and/or inter molecular crosslinking to produce thermally stabilized fibers, which prevents shrinking, melting, and fusing during carbonization. Suitable time periods for the stabilization to occur are stated above.

If preferred the green fiber may be stabilized at a temperature above the Tg of the High Tg Lignin material.

Typically, the stabilized fibers may be converted to carbon fiber by a carbonization process in an inert atmosphere at temperatures greater than 400° C., usually greater than 800° C., typically 1000-1500° C. Not to be limited by theory it is believed that during carbonization, a series of condensation reactions are going on and accompanied by out-gassing and weight loss. The carbonization can result in the increase of carbon content to of the fiber to near 100%, likewise a reduction of hydrogen content to near 0%. Carbonization may also reduce heteroatom content.

A method to reduce the stabilization time is also disclosed herein which includes heat treating a lignin precursor absent an active ingredient in an inert atmosphere at a sufficient temperature for a sufficient period of time to raise the glass transition temperature (Tg) of the precursor to more than 100° C., thereby forming a lignin precursor having an increased Tg (High Tg Lignin). This method may further include the above spinning and stabilizing steps as described above as further processing.

In particular embodiments, the Tg of the High Tg Lignin may be at least 105° C. In a further embodiment the Tg may be at least 115° C., even further it may be at least 125° C., even more preferred at least 150° C.

The High Tg Lignin has a Tg higher than that of the lignin in its native and/or as received form. The High Tg Lignin may have increased cross-linking as compared to the "native" or "as-received" lignin.

In addition to the lignin precursor, either the "as received" lignin and/or the High Tg lignin may be combined with other materials used for making fibers, such as polyacrylonitrile ("PAN"), isotropic pitch, mesophase pitch, rayon, polymers (such as but not limited to polybenzoxazole, polyhydroxyamide, polyamide, etc.), and combinations thereof any time prior to spinning. In another embodiment, other potential materials which may be blended with lignin include pitch, coal tar distillate, decant oil and combinations thereof. In the case of the mixture including the High Tg Lignin, the materials may be blended and spun into a fiber. Alternatively, these materials are blended and co-heat treated with the lignin. The co-heat treated materials are then spun into a fiber.

If so desired the precursors may be mixed in the mixing zone of the extruder in communication with the spinneret, e.g., the High Tg Lignin and one of the other above precursors may be feed from two different extrudes to the spinneret block.

In a further embodiment, the lignin in a native or an "as received" form may be reacted with furfuryl alcohol in the presence of a Lewis Acid or a Bronsted Acid. Alternatively, this reacting may occur with the High Tg Lignin instead of the native or "as received" lignin.

Applications of the carbon fiber disclosed herein includes a precursor for making insulation, felt, as an additive or filler for synthetic graphite billets or electrodes, a lithium ion battery anode, which may be in either a monolithic or powder form, an electrode for a flow battery, activated carbon fibers, such as those for a natural gas storage media or other applications for activated carbon fibers, and fillers or additives for non-conductive materials.

In the case of making insulation, the carbon fibers can be manipulated into a desired shape or configuration and combined with a binder. The composite of the carbon fibers and the binder may then be carbonized and if so desired subsequently graphitized. If so desired, the carbonization and graphitization steps may be completed in separate processing vessels and the steps may be spaced apart in time or the same processing vessel and one step may start immediately after completion of the first step. The felt may be formed in the same manner. One distinction may be that the felt precursor does not include the step of adding the binder to the carbon fibers. Additionally, the processing of make the felt may optionally include needling the carbon fibers once formed into a desired shape or configuration. The carbon fibers may be formed into a powder of desired size by milling the fibers.

Likewise, the carbon fibers may be an additive/filler for either of synthetic graphite or polymers. In the case of the synthetic graphite, the carbon fibers may be combined with coke and pitch to produce a preferred graphite billet of choice. Any known types of coke and pitch may be used in combination. The mixture of the three (3) precursors is formed to a desired shape ("the billet") and the billet is then carbonized and graphitized. If so desired, the carbonized billet may be impregnated with pitch or another carbonizable impregnant.

In the case of a polymeric resin, the carbon fiber may be added to the resin in a wet form to form a filled polymer. In an alternate embodiment, the fiber may be formed into a desired shape and used a back bone for a composite article. In this embodiment, the polymer is added to the carbon article already formed into a desired shape, thereby forming a prepreg. The prepreg is subsequently processed to form a desired product.

The various embodiments described herein can be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the advantages disclosed herein, unless the context specifically indicates the contrary.

The embodiments disclosed herein will now be further described by the below non-limiting examples.

EXAMPLES

Example 1. Effect of Heat Treatment on Lignin's Properties

Figure 2:
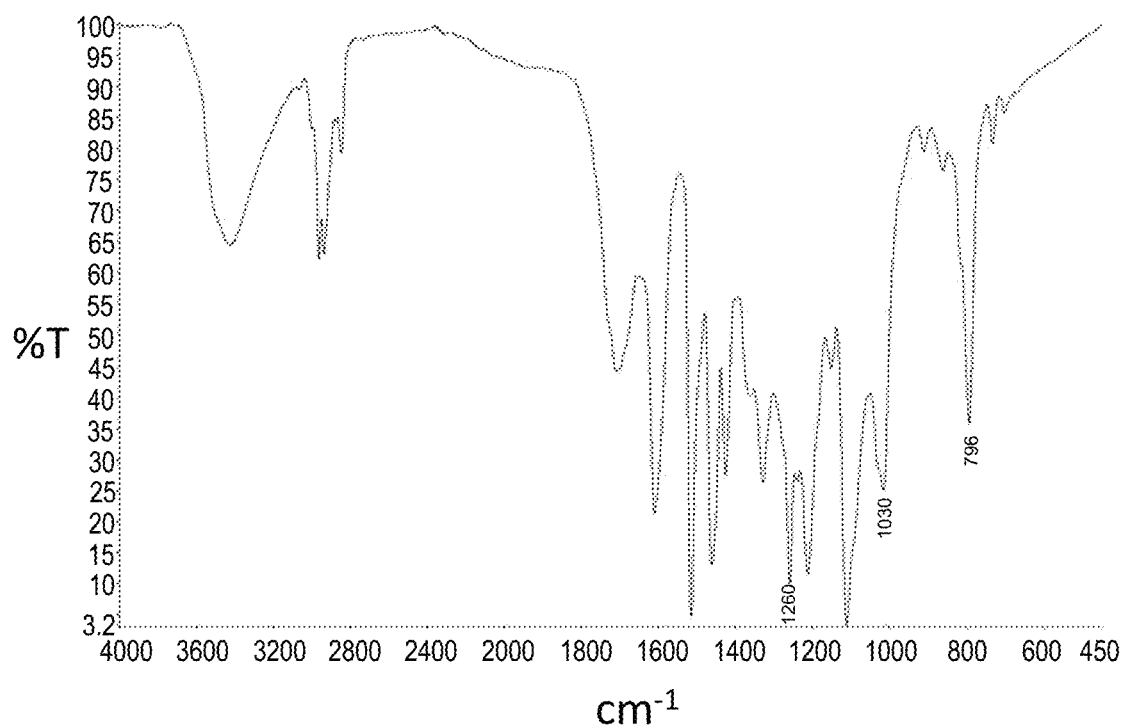
FIG. 2: FTIR spectra of a lignin after being heat treated at 250° C. for two (2) hours in an $N_2$ atmosphere.

A 500 g lignin sample was heated at 250° C. for 2 hours in nitrogen environment. The yield after the treatment was 90 wt %. A series of analysis was then carried out to compare the treated and "as-received" lignin. The heat treated lignin showed a clear structure change as illustrated FTIR spectra in FIG. 2 as compared to the FTIR of the "as-received" lignin shown in FIG. 1.

The most significant change was more ether bonds were formed as evidenced by the increase in the FTIR peak intensity of $v_{as}$, C—O—C (symbol for "asymmetrical stretch vibration") at 1260 cm$^{-1}$ and $v_s$, C—O—C (asymmetric stretch vibration) at 1030 cm$^{-1}$ and 796 cm$^{-1}$. It is believed the change implies the formation of ether bond linkage in the lignin, which resulted in a change the lignin properties.

DSC results indicate that the heat treated lignin has higher glass transition temperature (Tg), i.e., 134° C. for heat treated and 100° C. for "as-received" lignin. The TGA results listed in the table 1 shows a higher "on-site" weight loss temperature. "On-site" weight loss temperature is used herein to mean the temperature at which it is believed that the sample starts to lose weight. It is believed that the lignin with a higher on-site weight loss temperature will exhibit improved thermal stability.

Based on these experimental results, one can deduce that heat treatment of lignin in the inert atmosphere formed ether bond linkage between the lignin molecular cluster, which resulted in higher Tg and higher stability as compared to the as-received lignin. Another contributing factor may be the removal of small molecules with in the lignin during the heat treatment which also may contribute to the increase in Tg. It is believed that the higher Tg of the High Tg Lignin will allow the oxidative stabilization to start at higher temperature and at a higher heating rate.

TABLE 1

DSC and TGA analysis results of lignin vs. heat treated lignin

|  | Tg, ° C., from DSC | % wt loss on-site temperature, ° C., from TGA |
|---|---|---|
| As-received lignin | 100 | 219 |
| 250° C. heat treated for 2 hours in Nitrogen | 134 | 268 |

Example 2. Process of Converting Lignin to Carbon Fiber

The High Tg lignin was spun into fiber filament by centrifugal spinning method. The spun fiber was stabilized in air at a temperature up to about 300° C. with an average heating rate of about 0.5° C./min in the furnace; the total time for stabilization was about 13 hours. The stabilization heating ramp was from room temperature to 100° C. at a rate of about 3° C./minute. The temperature was then ramped from 100° C. to 150° C. at a ramp rate of about 0.35° C./minute. The temperature was held at 150° C. for a period of two (2) hours. The temperature in the furnace was then ramped up from 150° C. to 200° C. and a two (2) hour hold was implemented at 200° C. Lastly, the temperature in the furnace was ramped from 200° C. to 300° C. at a ramp rate of about 0.83° C./minute.

Figure 3:
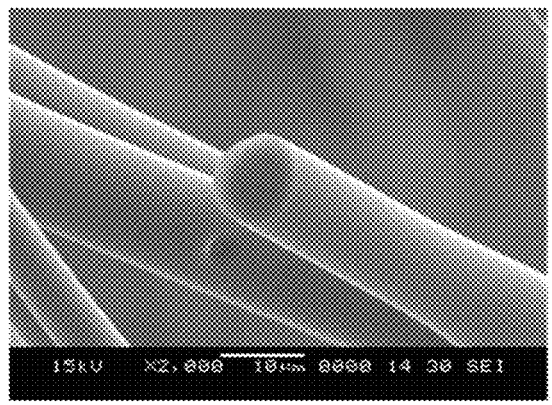
FIG. 3: SEM image of High Tg Lignin derived carbon fiber.
Figure 4:
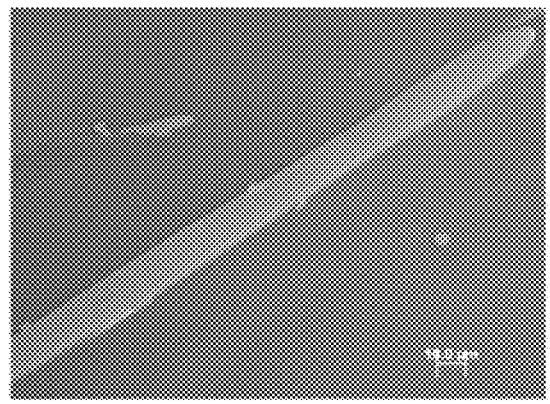
FIG. 4: Optical microscopic image under polarized light of a High Tg lignin derived carbon fiber.

The stabilized fiber was then carbonized at a peak temperature of about 1000° C. with a heating rate of 5° C./min and hold at 1000° C. for 1 hour. The total yield was 34 wt % from the "as-received" lignin to the final carbonized fiber. The lignin derived carbon fiber has an isotropic microstructure as shown in FIGS. 3 and 4.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims.

Thus, although there have been described particular embodiments of the present invention of a new and useful method for making carbon fiber, it is not intended that such references be construed as limitations upon the scope of this invention except as set forth in the following claims. The various embodiments discussed above may be practiced in any combination thereof.

What is claimed is:

1. A method of making a carbon fiber comprising:
   a. heat treating a lignin in an inert atmosphere at a sufficient temperature for a sufficient period of time to raise the glass transition temperature (Tg) of the lignin by at least twenty percent, thereby forming a lignin precursor having an increased Tg (High Tg Lignin);
   b. spinning the High Tg Lignin into a fiber; and
   c. stabilizing the fiber for a period of time of less than one hundred hours under sufficient conditions to thereby form a thermoset fiber.

2. The method of claim 1 wherein the period of time comprises less than fifty hours.

3. The method of claim 1 wherein the temperature of said heat treating comprises at least 100° C. to no more than 400° C.

4. The method of claim 3 wherein the temperature comprises at least 200° C.

5. The method of claim 1 further including reacting the High Tg Lignin with furfuryl alcohol in the presence of a Lewis acid or a Bronsted acid.

6. A method of making a lignin carbon fiber precursor comprising:
   heat treating a lignin in an oxidizing atmosphere at a sufficient temperature for a sufficient period of time to raise the glass transition temperature (Tg) of the lignin by at least twenty percent but not above the combustion temperature of the lignin, thereby forming a lignin precursor having an increased Tg (High Tg Lignin).

7. A method of claim 6 wherein the temperature of said heat treating comprises at least 100° C. to no more than 400° C.

8. A method of claim 6 further including reacting the High Tg Lignin with furfuryl alcohol in the presence of a Lewis acid or a Bronsted acid.

9. A method of making a carbon fiber precursor comprising:
   heat treating a lignin in an inert atmosphere at a sufficient temperature for a sufficient period of time to raise the glass transition temperature (Tg) of the lignin by at least twenty percent, thereby forming a lignin precursor having an increased Tg (High Tg Lignin).

10. The method of claim 6 further comprising spinning the High Tg Lignin into a fiber and stabilizing the fiber for a period of time of less than one hundred hours under sufficient conditions to thereby form a thermoset fiber.

11. The method of claim 9 the heating treating occurs at a temperature below 400° C.

12. The method of claim 9 further comprising reacting either the lignin or the High Tg Lignin with furfuryl alcohol in the presence of a Lewis Acid or a Bronsted Acid.

13. The method of claim 1 wherein a ramp rate of the stabilizing from room temperature to 100° C. comprises 3° C./minute.

14. The method of claim 1 wherein the Tg of the High Tg Lignin comprises more than 100° C.

15. The method of claim 10 wherein a ramp rate of the stabilizing from room temperature to 100° C. comprises 3° C./minute.

16. The method of claim 6 wherein the Tg of the High Tg Lignin comprises more than 100° C.

17. The method of claim 9 further comprising stabilizing a fiber derived from the lignin precursor, a ramp rate of the stabilizing from room temperature to 100° C. comprises 3° C./minute.

18. The method of claim 9 wherein the Tg of the High Tg Lignin comprises more than 100° C.

19. The method of claim 18 wherein a fiber derived from the lignin precursor comprises a thermoset fiber.

* * * * *